(12) United States Patent
Shimoda

(10) Patent No.: US 9,065,961 B2
(45) Date of Patent: Jun. 23, 2015

(54) IMAGE SENSOR UNIT, IMAGE READING APPARATUS, AND IMAGE FORMING APPARATUS

(71) Applicant: Canon Components, Inc., Kodama-gun, Saitama (JP)

(72) Inventor: Shuuichi Shimoda, Saitama (JP)

(73) Assignee: CANON COMPONENTS, INC. (JP)

( * ) Notice: Subject to any disclaimer, the term of this patent is extended or adjusted under 35 U.S.C. 154(b) by 0 days.

(21) Appl. No.: 14/259,207

(22) Filed: Apr. 23, 2014

(65) Prior Publication Data

US 2014/0333975 A1    Nov. 13, 2014

(30) Foreign Application Priority Data

May 8, 2013  (JP) ................................. 2013-098698
Apr. 4, 2014  (JP) ................................. 2014-077717

(51) Int. Cl.
*H04N 1/04*    (2006.01)
*H04N 1/028*    (2006.01)

(52) U.S. Cl.
CPC ................................. *H04N 1/02815* (2013.01)

(58) Field of Classification Search
CPC .......... H04N 2201/03125; H04N 2201/03141; H04N 2201/03145; H04N 2201/03112; H04N 5/2256; H04N 1/02835; H04N 2201/02456; H04N 2201/02479; G03H 1/0011; G03H 1/22; G03H 1/2286
USPC .......... 358/475, 474, 509, 448, 482, 483, 505
See application file for complete search history.

(56) References Cited

U.S. PATENT DOCUMENTS

| | | | | |
|---|---|---|---|---|
| 5,499,112 | A * | 3/1996 | Kawai et al. ................... | 358/475 |
| 6,115,187 | A * | 9/2000 | Tabata et al. ................... | 359/654 |
| 6,357,903 | B1 * | 3/2002 | Furusawa et al. ............. | 362/555 |
| 6,360,030 | B1 * | 3/2002 | Kawai et al. ................... | 382/312 |
| 6,456,748 | B1 * | 9/2002 | Yushiya et al. ................ | 382/312 |
| 7,538,912 | B2 * | 5/2009 | Sawada ......................... | 358/483 |
| 7,828,726 | B2 * | 11/2010 | Negishi ......................... | 600/178 |
| 8,199,377 | B2 * | 6/2012 | Wakisaka et al. ............. | 358/475 |
| 8,305,552 | B2 * | 11/2012 | Nishinaga et al. ............. | 355/53 |
| 8,379,275 | B2 * | 2/2013 | Tahk et al. ..................... | 358/475 |
| 8,422,917 | B2 * | 4/2013 | Shinkawa ...................... | 399/200 |
| 8,576,460 | B2 * | 11/2013 | Takeda et al. ................. | 358/475 |
| 8,654,414 | B2 * | 2/2014 | Han et al. ...................... | 358/475 |
| 8,810,867 | B2 * | 8/2014 | Sawada ......................... | 358/474 |
| 8,842,344 | B2 * | 9/2014 | Shimoda ....................... | 358/474 |
| 2007/0285740 | A1 * | 12/2007 | Onishi et al. .................. | 358/475 |
| 2013/0265618 | A1 * | 10/2013 | Kobayashi .................... | 358/475 |

FOREIGN PATENT DOCUMENTS

| | | |
|---|---|---|
| JP | 2007-251353 A | 9/2007 |
| JP | 2008-042544 A | 2/2008 |

\* cited by examiner

*Primary Examiner* — Negussie Worku
(74) *Attorney, Agent, or Firm* — Rossi, Kimms & McDowell LLP

(57) ABSTRACT

A circuit board of an image sensor unit of this invention includes a substrate, a first circuit pattern portion formed on the substrate, and a second circuit pattern portion formed continuously from the first circuit pattern portion. A light source is connected to the second circuit pattern portion. The light source is arranged facing an incident surface by bending the second circuit pattern portion.

8 Claims, 15 Drawing Sheets

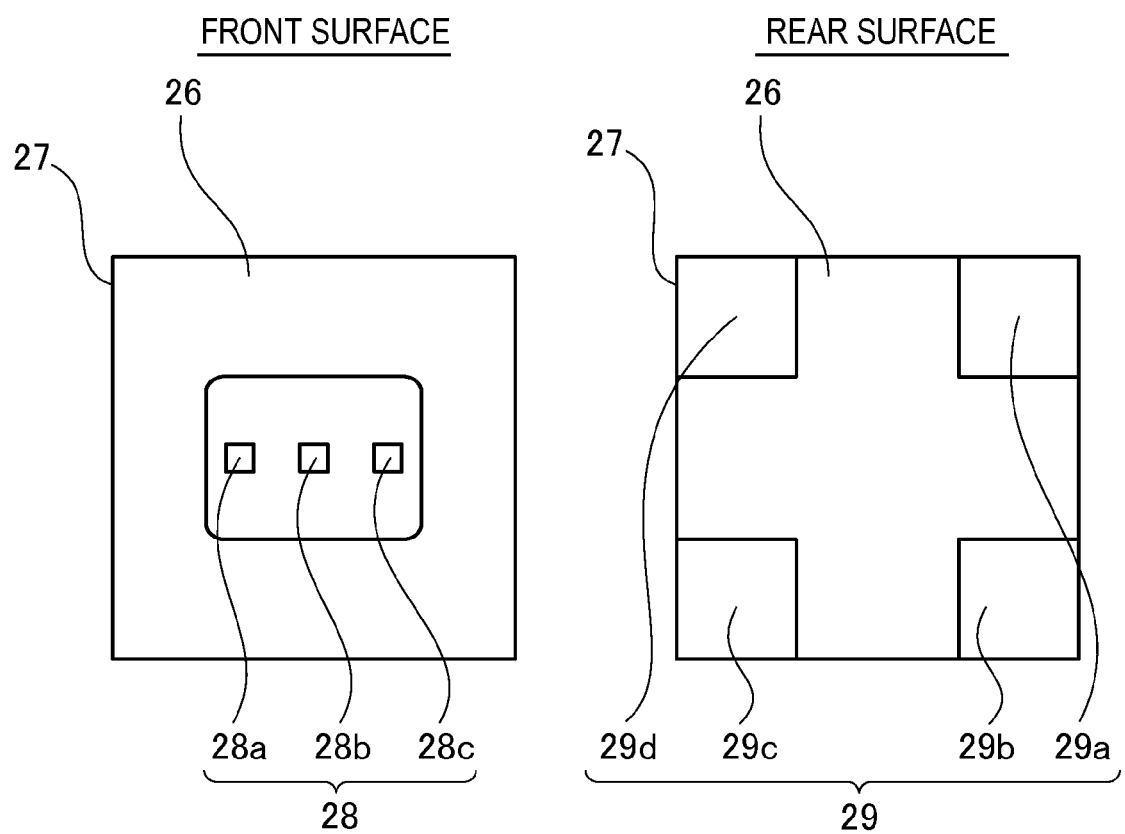

IMAGE SENSOR UNIT, IMAGE READING APPARATUS, AND IMAGE FORMING APPARATUS

CROSS-REFERENCE TO RELATED APPLICATIONS

This application is based upon and claims the benefit of priority of the prior Japanese Patent Application No. 2013-098698, filed on May 8, 2013, and the Japanese Patent Application No. 2014-077717, filed on Apr. 4, 2014, the entire contents of which are incorporated herein by reference.

BACKGROUND OF THE INVENTION

1. Field of the Invention

The present invention relates to an image sensor unit, an image reading apparatus, and an image forming apparatus.

2. Description of the Related Art

An illumination apparatus or an image sensor unit or the like that includes a light source and a light guide or the like is known. Patent Document 1 discloses a light source apparatus that has LED chips. In the light source apparatus disclosed in Patent Document 1, in order to arrange the LED chips so as to face an incident surface of a light guide, terminals are formed so as to protrude to a substrate side from a resin package. The terminals are connected to the substrate through leads. According to the technology disclosed in Patent Document 1, the cost of image sensor units is increased because light source apparatuses in which the shapes of resin packages and the heights of terminals are different are required for each kind of image sensor unit.

Patent Document 2 discloses an image sensor in which LED light emitting elements are mounted on an LED substrate. According to the technology disclosed in Patent Document 2, because LED light emitting elements can be mounted on an LED substrate, inexpensive surface-mount LED light emitting elements with respect to which it is not necessary to form terminals can be applied.

Patent Document 1
  Japanese Laid-open Patent Publication No. 2008-42544
Patent Document 2
  Japanese Laid-open Patent Publication No. 2007-251353

SUMMARY OF THE INVENTION

However, in Patent Document 2, in order to arrange the LED light emitting elements so as to face the incident surface of the light guide, the LED substrate and a sensor substrate are connected through a flexible substrate having flexibility. Consequently, there is the problem that it is difficult to reduce the cost of the image sensor unit since a flexible substrate is added to the configuration.

The present invention has been made in view of the foregoing problem, and an object of the present invention is to reduce the cost of an image sensor unit.

An image sensor unit according to the present invention is an image sensor unit that reads right emitted to an object of illumination, including: a light source; a light guide that guides right from the light source to the object of illumination; a light condenser that focuses light from the object of illumination; an image sensor that receives light that is focused by the light condenser, and converts the light to an electric signal; and a circuit board on which the light source and the image sensor are mounted; wherein: the light guide includes an incident surface from which the light from the light source enters, and an emission surface that emits the light which enters from the incident surface to the object of illumination; the circuit board includes a substrate, a first circuit pattern portion formed on the substrate, and a second circuit pattern portion that is formed continuously from the first circuit pattern portion; and the light source is connected to the second circuit pattern portion, and the light source is arranged facing the incident surface by bending the second circuit pattern portion.

An image reading apparatus according to the present invention includes the above described image sensor unit, and a moving portion that relatively moves the image sensor unit and the object of illumination.

An image forming apparatus according to the present invention includes: the above described image sensor unit, a moving portion that relatively moves the image sensor unit and the object of illumination, and an image forming portion that forms an image that is read by the image sensor unit on a recording medium.

BRIEF DESCRIPTION OF THE DRAWINGS

FIG. 2 is a view illustrating a configuration of an LED module 26;

DETAILED DESCRIPTION OF THE PREFERRED EMBODIMENTS

Embodiments that can apply the present invention will now be described in detail with reference to the drawings. The present embodiments provide an illumination apparatus, an image sensor unit to which the illumination apparatus is applied, as well as an image reading apparatus and an image forming apparatus to which the image sensor unit is applied. In the image reading apparatus and the image forming apparatus, the image sensor unit emits light to an original P as an object of illumination and converts reflection light to an electric signal to read an image (reflection reading). The object of illumination is not limited to the original P, and an object to be read such as a bill can also to applied. Transmission reading that reads an image by converting transmitted light transmitted through the original P to an electric signal can also be applied.

In the following description, three-dimensional directions will be indicated by X, Y, and Z arrows. The X direction denotes a main-scan direction, the Y direction denotes a sub-scan direction perpendicular to the main-scan direction, and the Z direction denotes a perpendicular direction (vertical direction).

(First Embodiment)

Figure 19:
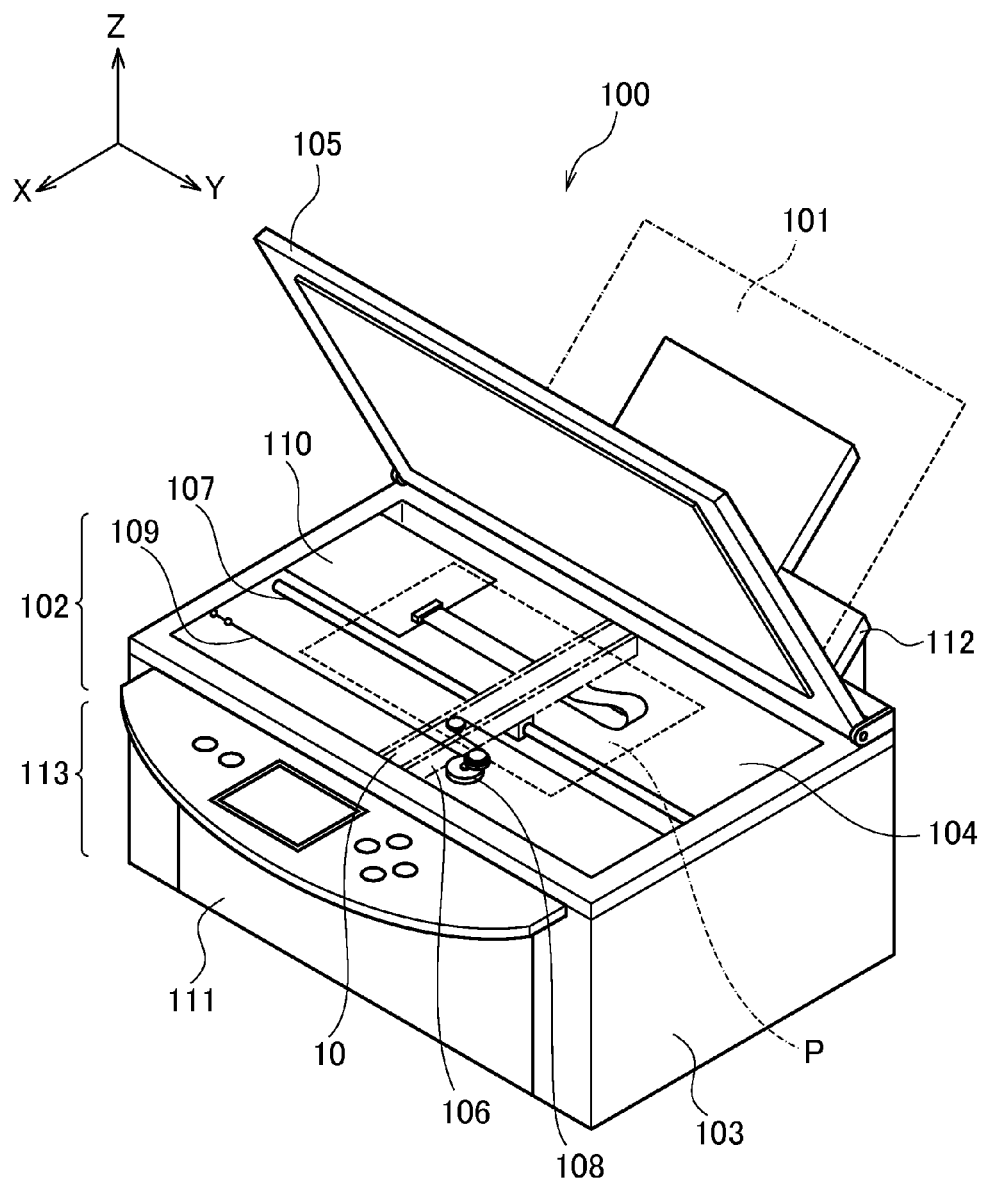
FIG. 19 is a perspective view illustrating an appearance of an MFP 100 including the image sensor unit 10.

First, the configuration of a multi-function printer (MFP) as an example of the image reading apparatus or the image forming apparatus of the present embodiment will be described referring to FIG. 19. FIG. 19 is a perspective view illustrating an appearance of an MFP 100. As illustrated in FIG. 19, the MFP 100 includes an image reading portion 102 as image reading means for reading reflection light from an original P, and an image forming portion 113 as image forming means for forming (printing) an image of the original P on a sheet 101 (recording paper) as a recording medium.

The image reading portion 102 has a function of a so-called image scanner and has the following configuration, for example. The image reading portion 102 includes: a housing 103; a platen glass 104 as an original placing portion made of a glass transparent plate; and a platen cover 105 that can be freely opened and closed relative to the housing 103 so as to be able to cover the original P.

The housing 103 houses an image sensor unit 10 including an illumination apparatus, a holding member 106, an image sensor unit slide shaft 107, an image sensor unit drive motor 108, a wire 109, a signal processing portion 110, a recovery unit 111, a paper feeding tray 112, and the like.

The image sensor unit 10 is a contact image sensor (CIS) unit, for example. The holding member 106 surrounds and holds the image sensor unit 10. The image sensor unit slide shaft 107 guides the holding member 106 in the sub-scan direction along the platen glass 104. The image sensor unit drive motor 108 is a moving portion that relatively moves the image sensor unit 10 and the original P, and more specifically moves the wire 109 a attached to the holding member 106. The recovery unit 111, which can be freely opened and closed relative to the housing 103, recovers the printed sheet 101. The paper feeding tray 112 houses the sheet 101 in a predetermined size.

In the image reading portion 102 with the above described configuration, the image sensor unit drive motor 108 moves the image sensor unit 10 in the sub-scan direction along the image sensor unit slide shaft 107. At such time, the image sensor unit 10 optically reads the original P placed on the platen glass 104 and converts the light to an electric signal to perform a reading operation of an image.

Figure 20:
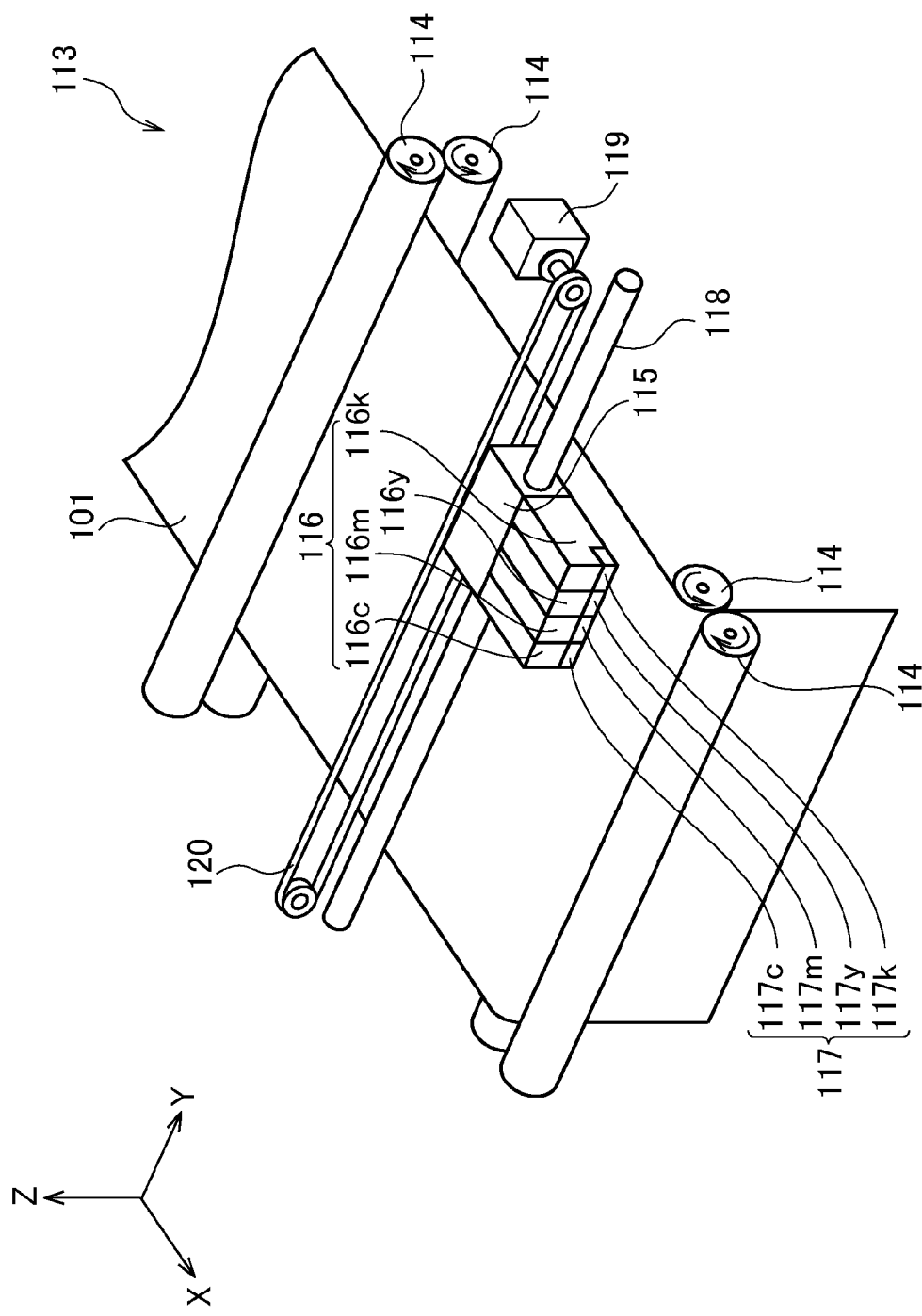
FIG. 20 is a schematic view illustrating a structure of an image forming portion 113 of the MFP 100.

FIG. 20 is a schematic view illustrating the structure of the image forming portion 113.

The image forming portion 113 has a function of a so-called printer and is configured, for example, as follows. The image forming portion 113 is housed in the housing 103, and as illustrated in FIG. 20, includes conveyor rollers 114 and a recording head 115. The recording head 115 includes, for example, ink tanks 116 (116c, 116m, 116y, and 116k) with cyan C, magenta M, yellow Y, and black K inks; and discharge heads 117 (117c, 117m, 117y, and 117k) arranged on the ink tanks 116, respectively. The image forming portion 113 also includes a recording head slide shaft 118, a recording head drive motor 119, and a belt 120 attached to the recording head 115.

In the image forming portion 113 with the configuration described above, the conveyor rollers 114 convey the sheet 101 supplied from the paper feeding tray 112 to the recording position. The recording head drive motor 119 mechanically moves the belt 120, and the recording head 115 performs printing on the sheet 101 based on an electric signal while moving in a printing direction (main-scan direction) along the recording head slide shaft 118. The operation is repeated until the printing is finished, and thereafter the conveyor rollers 114 eject the printed sheet 101 to the recovery unit 111.

Although the image forming apparatus of an inkjet type has been described as the image forming portion 113, the type can be any type, such as an electrophotographic type, a thermal transfer type, and a dot impact type.

Figure 1:
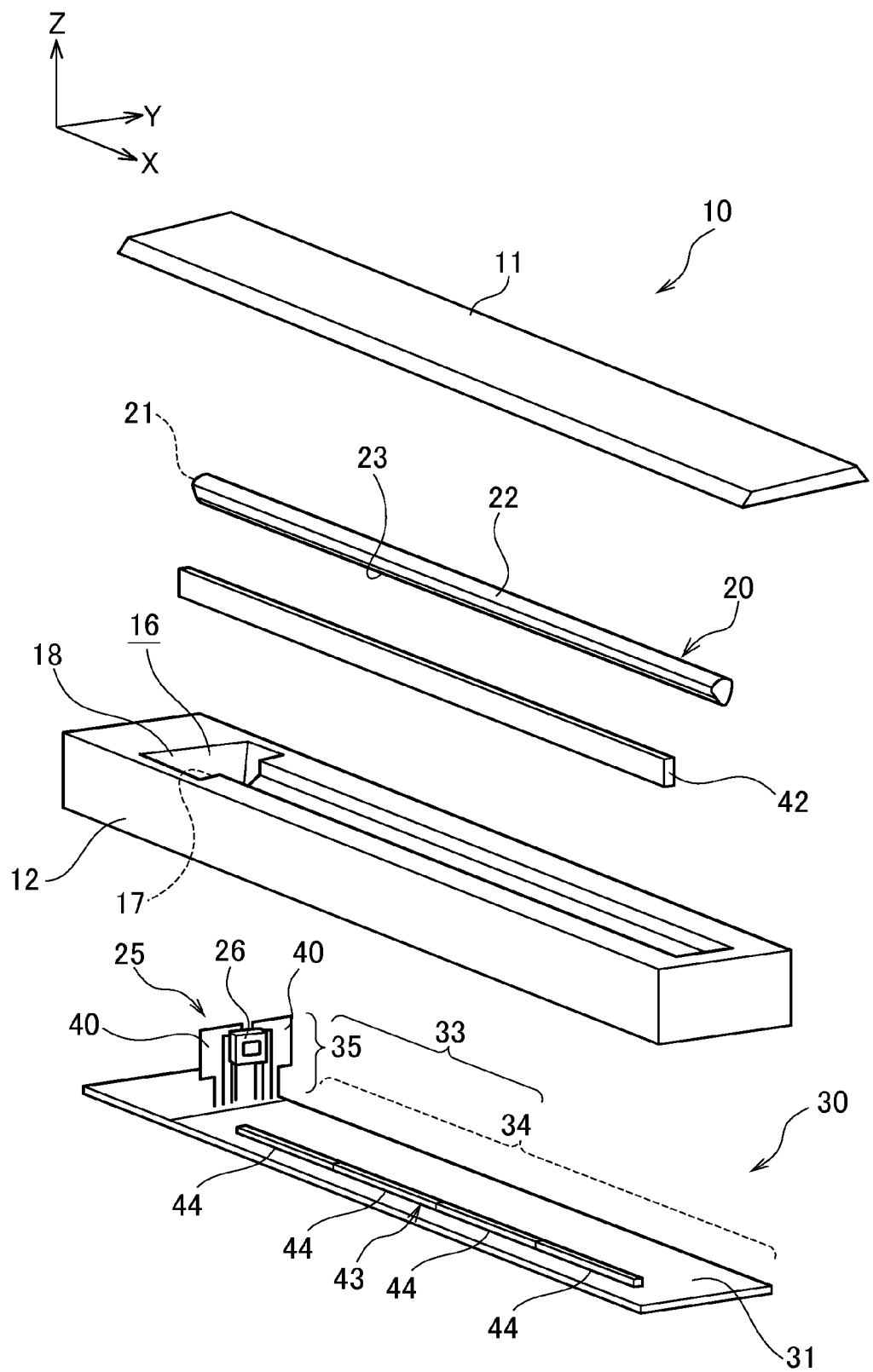
FIG. 1 is an exploded perspective view of an image sensor unit 10.
Figure 21:
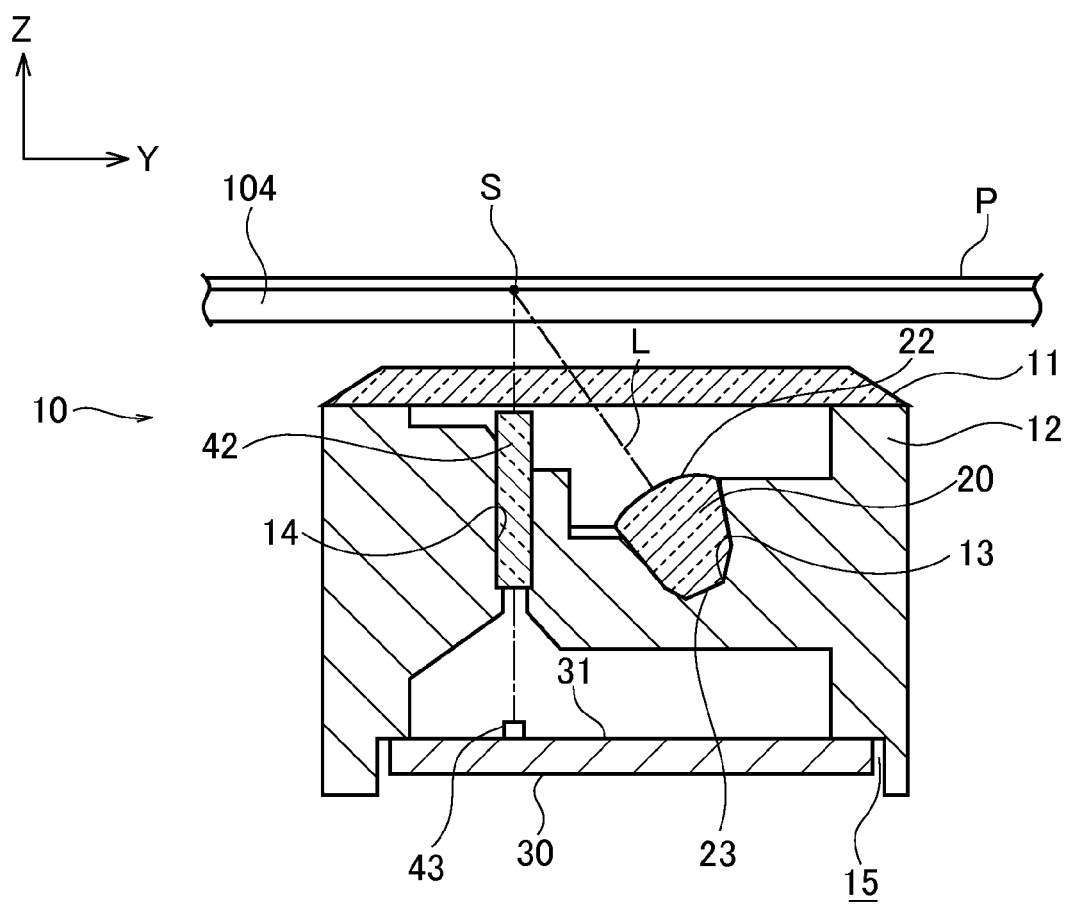
FIG. 21 is a sectional view of the image sensor unit 10.

Next, the image sensor unit 10 of the present embodiment will be described referring to FIG. 21 and FIG. 1. FIG. 21 is a sectional view of the image sensor unit 10 obtained by cutting along the sub-scan direction. FIG. 1 is an exploded perspective view of the image sensor unit 10.

The image sensor unit 10 includes a cover glass 11, a frame 12, a light guide 20, a light source 25, a circuit board 30, a light condenser 42, an image sensor 43, and the like. Among these constituent members, the light guide 20, the light source 25, and the circuit board 30 can be caused to function as an illumination apparatus. Further, among the aforementioned constituent members, the cover glass 11, the frame 12, the light guide 20, the circuit board 30, the light condenser 42, and the image sensor 43 have lengths according to a dimension in the main-scan direction of the original P to be read.

The cover glass 11 prevents dust from entering the frame 12. The cover glass 11 has a substantially plate shape, and for example, a double-sided tape is used to fix the cover glass 11 to the frame 12 so as to cover the upper direction of the frame 12. Although the cover glass 11 is not necessarily required in the present invention and can be omitted therefrom, it is desirable to provide the cover glass 11 to protect the image sensor unit 10 from scattered dust and damage. The material of the cover glass 11 is not limited to glass. For example, a member made of a transparent resin material such as an acrylic resin or polycarbonate and on the surface of which, as necessary, a hard-coat was applied can be used as the cover glass 11.

The frame 12 is a supporting body that houses the respective constituent members of the image sensor unit 10. The frame 12 is a substantially rectangular solid that is long in the main-scan direction and is formed to be able to position and support the constituent members inside. As illustrated in FIG. 21, a light guide housing portion 13 that houses the light guide 20, and a light condenser housing portion 14 that houses the light condenser 42 are formed in the frame 12 in the main-scan direction. On a lower surface of the frame 12, a substrate housing portion 15 for arranging the circuit board 30 is formed in a concave shape from the outside of the frame 12 throughout the main-scan direction. The circuit board 30 housed in the substrate housing portion 15 is fixed in the substrate housing portion 15 by heat caulking, for example. On one side in the main-scan direction of the frame 12, a space 16 in which the light source 25 is arranged is formed that opens in the vertical direction of the frame 12. Further, in the frame 12, a wall surface 17 and a wall surface 18 that are orthogonal to the main-scan direction are formed facing each other so as to sandwich the space 16 therebetween. The frame 12 is formed by a light-blocking resin material that is colored in black, for example. Polycarbonate can be applied as the resin material, for example.

The light guide 20 shapes the light emitted from the light source 25 into a line, and guides the light to the original P. The light guide 20 is formed by a transparent material, such as glass or a resin material, and is formed in an elongated rod shape in the main-scan direction. For example, an acrylic resin material can be applied as the transparent resin material. The light guide 20 is inserted to the light guide housing portion 13 of the frame 12 from the upper direction, and is held in the light guide housing portion 13.

In the light guide 20, an incident surface 21 from which the light from the light source 25 enters is formed at one of both end faces in the main-scan direction. The incident surface 21 is arranged orthogonal to the main-scan direction. On a surface facing the original P, the light guide 20 includes an emission surface 22 for emitting the light incident on the light guide 20 to the original P. Further, on a surface facing the emission surface 22, the light guide 20 includes a diffusing surface 23 for reflecting and diffusing the light which has entered from, the incident surface 21. A light diffusing pattern made of a light reflective paint based on, for example, silk screen printing is formed on the diffusing surface 23. The light which has entered from the incident surface 21 is diffused by the light diffusing pattern and is emitted from the emission surface 22 to the original P. Surfaces other than the emission surface 22 and the diffusing surface 23 function as reflection surfaces for reflecting the incident light.

The light source 25 emits light to the original P through the light guide 20 by emitting light. An LED module 26 on which LED chips 28 are mounted is used as the light source 25 of the present embodiment.

FIG. 2 is a view that illustrates the configuration of the LED module 26. The LED module 26 of the present embodiment is a so-called top-view type surface-mount LED module having the LED chips 28 mounted on the front surface thereof and electrodes 29 formed on the rear surface. Since surface-mount LED modules are used for general purpose applications, it is possible to reduce costs by applying the surface-mount LED modules to the image sensor unit 10 and the illumination apparatus.

Specifically, the LED module 26 has a housing 27 that is formed in a substantially rectangular solid shape. The surface of the housing 27 is formed in a flat shape, and the LED chips 28 are arranged thereon as light emitting portions. In this case, a plurality of (for example, three) LED chips 28 (28a, 28b, 28c) are provided in a state in which the LED chips 28 are sealed by a transparent resin. For example, LED chips with red, green, and blue emission wavelengths can be applied as the LED chips 28a, 28b, and 28c. In a case of use as a paper sheet distinguishing apparatus that determines authenticity of bills and the like, for example, the LED module 26 that includes LED chips with infrared and ultraviolet emission wavelengths or the like can be applied.

The rear surface of the housing 27 is formed in a flat shape, and the electrodes 29 are formed thereon. In this case, a plurality of (for example, four) electrodes 29 (first electrode portion 29a to fourth electrode portion 29d) are formed at the respective corners. The LED chips 28 turn on when power is supplied to the LED chips 28 through the electrodes 29.

As illustrated in FIG. 1, the surface of the LED module 26 is arranged orthogonal to the main-scan direction. Specifically, the LED module 26 is arranged at a position such that the LED chips 28 face the incident surface 21 of the light guide 20.

The circuit board 30 is formed in a plate shape that is long in the main-scan direction. A mounting surface 31 of the circuit board 30 is orthogonal to the vertical direction. A driving circuit for making the LED module 26 emit light is mounted on the mounting surface 31 of the circuit board 30.

Figure 3A:
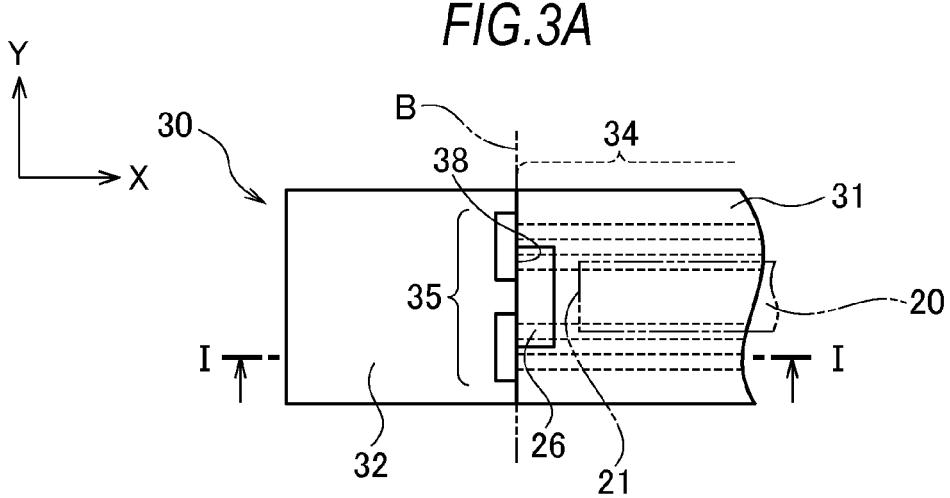
FIG. 3A is a plan view illustrating a configuration of a circuit board 30 according to a first embodiment.
Figure 3B:
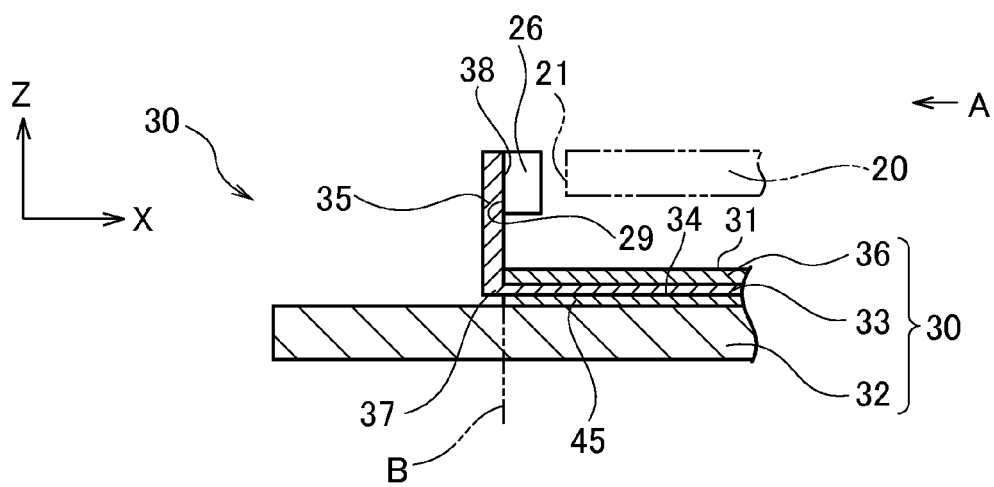
FIG. 3B is a sectional view obtained by cutting the circuit board 30 illustrated in FIG. 3A along a line I-I.
Figure 3C:
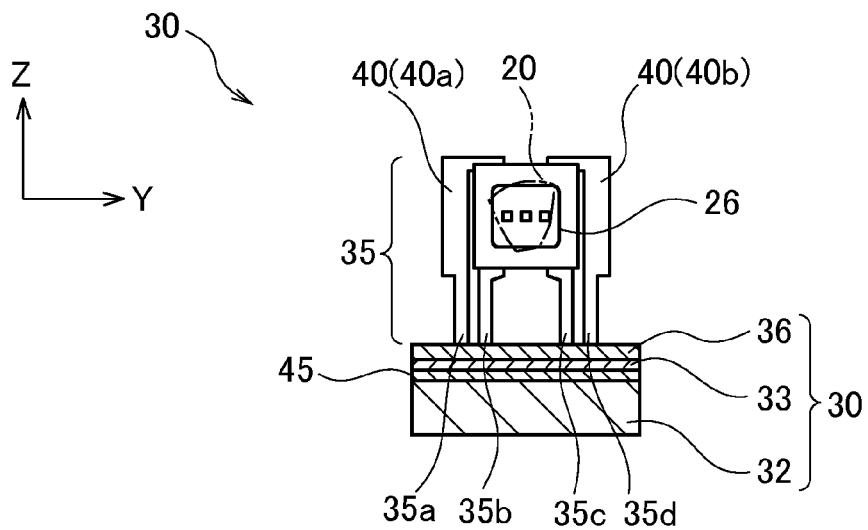
FIG. 3C is a view of the circuit board 30 illustrated in FIG. 3B as seen from an arrow A direction.

The circuit board 30 will now be described in detail with reference to FIG. 3A to FIG. 3C. FIG. 3A is a plan view illustrating a configuration of the LED module 26 side of the circuit board 30. FIG. 3B is a sectional view obtained by cutting the circuit board 30 illustrated in FIG. 3A along a line I-I, FIG. 3C is a view of the circuit board 30 illustrated in FIG. 3B as seen from an arrow A direction.

The circuit board 30 includes, for example, a substrate 32, a circuit pattern 33, and a resist 36 that are laminated on a glass epoxy substrate.

In a case of applying the circuit board 30 to an illumination apparatus, the circuit board 30 may be a flexible circuit board, and a polyimide film or the like can be used as the substrate 32. The illumination apparatus can be thinned and lightened by using a flexible substrate.

The circuit pattern 33 or the present embodiment includes a first circuit pattern portion 34 and a second circuit pattern portion 35. The first circuit pattern portion 34 and the second circuit pattern portion 35 are formed integrally in a continuous manner.

The first circuit pattern portion 34 is bonded onto the substrate 32 via an adhesive 45. That is, a pattern face of the first circuit pattern portion 34 is formed parallel to the mounting surface 31. The first circuit pattern portion 34 is covered by the resist 36 from the upper side.

The second circuit pattern portion 35 is formed so as to be capable of bending away from the substrate 32. Specifically, the second circuit pattern portion 35 assumes a vertically upright position by bending 90 degrees with respect to the mounting surface 31 at a curved portion 37 adjacent, to a boundary line (see an alternate long and two short dashes line B in the sub-scanning line direction illustrated in FIG. 3A and FIG. 3B) between the second circuit pattern portion 35 and the first circuit pattern portion 34. Accordingly, a pattern face 38 of the second circuit pattern portion 35 is orthogonal to the main-scan direction. The second circuit pattern portion 35 is not covered by the resist 36 and is thus exposed.

The LED module 26 is mounted on the second circuit pattern portion 35. Specifically, the pattern face 38 of the second circuit pattern portion 35 that faces the incident surface 21 of the light guide 20 is welded with the electrodes 29 of the LED module 26 to thereby connect the second circuit pattern portion 35 and the LED module 26. According to the present embodiment, the second circuit pattern portion 35 includes a first wiring portion 35a to a fourth wiring portion 35d. The first wiring portion 35a is connected to the first electrode portion 29a; the second wiring portion 35b is connected to the second electrode portion 29b, the third wiring portion 35c is connected to the third electrode portion 29c, and the fourth wiring portion 35d is connected to the fourth electrode portion 29d.

By connecting the LED module 26 in this manner to the second circuit pattern portion 35 that is bent, the LED chips 28 of the LED module 26 can be arranged facing the incident surface 21 or the light guide 20. Further, as illustrated in FIG. 3C, the second circuit pattern portion 35 has a positioning portion 40 for positioning the second circuit pattern portion 35 with respect to the frame 12.

The positioning portion 40 has a first positioning portion 40a that is formed integrally with the first wiring portion 35a, and a second positioning portion 40b that is formed integrally with the fourth wiring portion 35d. The first positioning portion 40a is formed at an area at which the first wiring portion 35a extends in the sub-scan direction away from the LED module 26. The second positioning portion 40b is formed at an area at which the fourth wiring portion 35d extends in the sub-scan direction away from the LED module 26.

The second circuit pattern portion 35 can be positioned with respect to the frame 12 by adhering the first positioning portion 40a and the second positioning portion 40b to either of the wall surface 17 and the wail surface 18 formed in the space 16 of the frame 12. Accordingly, since the LED module 26 connected to the second circuit pattern portion 35 is also similarly positioned with respect to the frame 12, the LED chips 28 of the LED module 26 can be held at a position facing the incident surface 21 of the light guide 20. The method of manufacturing the circuit board 30 will be described later referring to FIG. 4 to FIG. 10B.

Referring again to FIG. 21 and FIG. 1, the light condenser 42 is an optical member that forms an image of the reflection light from the original P on the image sensor 43. The light condenser 42 can be, for example, a rod-lens array with a plurality of image-forming elements (rod lenses) of an erect equal magnification image-forming type linearly arranged in the main-scan direction. The light condenser 42 is inserted into the light condenser housing portion 14 of the frame 12 from the upper direction, and is held in the light guide housing portion 13. The configuration of the light condenser 42 is not limited to the above described configuration as long as an image can be formed on the image sensor 43. The light condenser 42 can be an optical member with various well-known conventional light condensing functions, such as various micro-lens arrays.

The image sensor 43 is mounted on the circuit board 30 and is arranged in the lower direction of the light condenser 42. The image sensor 43 includes a predetermined number of image sensor ICs 44 that are formed by a plurality of light receiving elements (the light receiving elements may also be called photoelectric conversion elements) corresponding to the resolution of reading by the image sensor unit 10 and are arranged and mounted in a line in the main-scan direction on the mounting surface 31 of the circuit board 30. The image sensor 43 receives the reflection light that was reflected from the original P and formed into an image by the light condenser 42, and converts the received reflection light to an electric signal. The configuration of the image sensor 43 is not limited to the above described configuration as long as the reflection light reflected from the original P can be converted to an electric signal. The image sensor ICs 44 can be various well-known image sensor ICs.

In the usage sensor unit 10 with the configuration described above, the light source 25 arranged in the frame 12 is turned on to emit light as indicated by an arrow L from the light guide 20 to the lower surface of the original P. Therefore, the light is linearly emitted to the original P throughout a reading line S (main-scan direction). The light is reflected by the original P, and reflection light is imaged on the image sensor 43 through the light condenser 42. The image sensor 43 can convert the imaged reflection light to an electric signal to read the image on the lower surface of the original P.

The image sensor 43 reads the reflection light of one scan line, and the reading operation of one scan line in the main-scan direction of the original P is completed. After the completion of the reading operation of one scan line, a reading operation of the next scan line is performed in the same way as the operation described above, along with relative movement of the original P in the sub-scan direction. In this way, the image sensor unit 10 repeats the reading operation of one scan line while moving in the sub-scan direction. The entire surface of the original P is successively scanned, and the image is read based on the reflection light.

Figure 4:
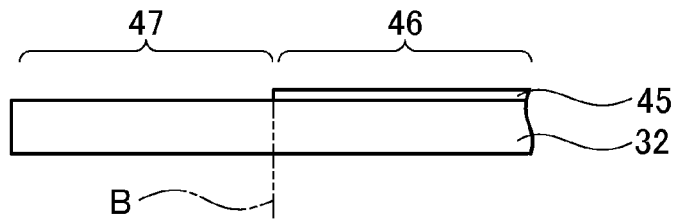
FIG. 4 is a view for describing a method of manufacturing the circuit board 30.
Figure 5:
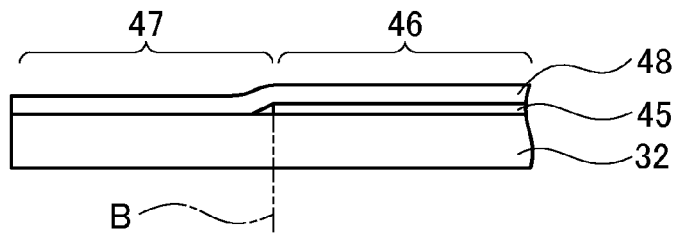
FIG. 5 is a view for describing the method of manufacturing the circuit board 30.
Figure 6:
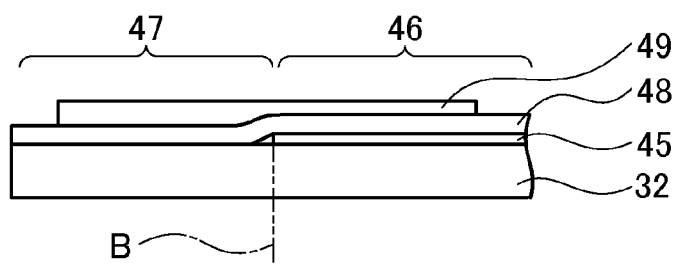
FIG. 6 is a view for describing the method of manufacturing the circuit board 30.
Figure 7:
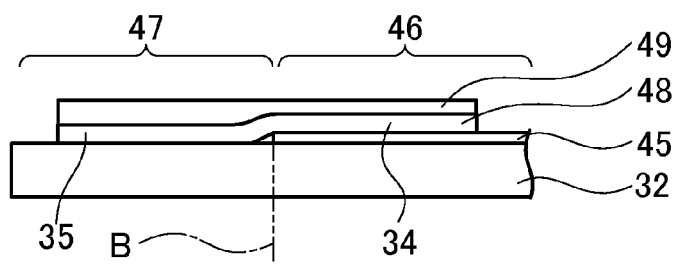
FIG. 7 is a view for describing the method of manufacturing the circuit board 30.
Figure 8:
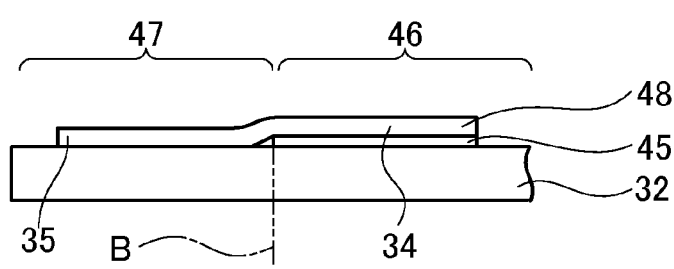
FIG. 8 is a view for describing the method of manufacturing the circuit board 30.
Figure 9A:
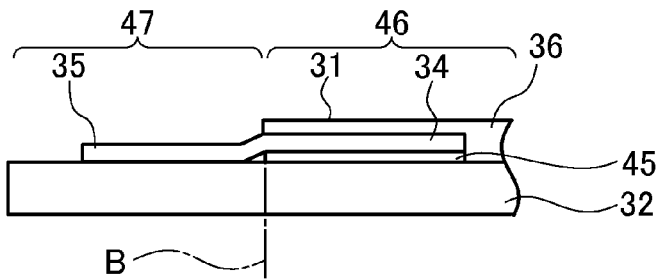
FIG. 9A is a view for describing the method of manufacturing the circuit board 30.
Figure 9B:
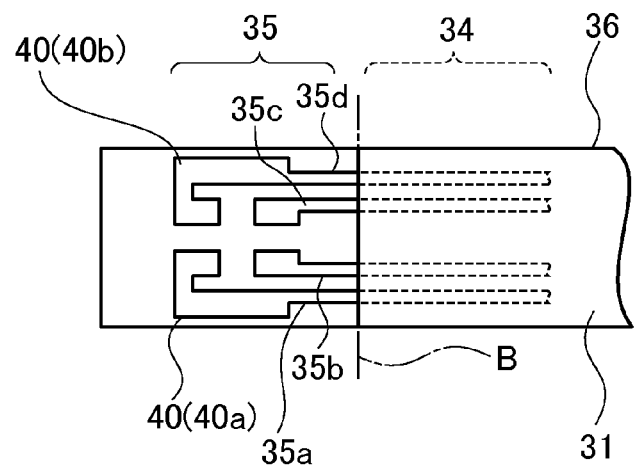
FIG. 9B is a view for describing the method of manufacturing the circuit board 30.
Figure 10A:
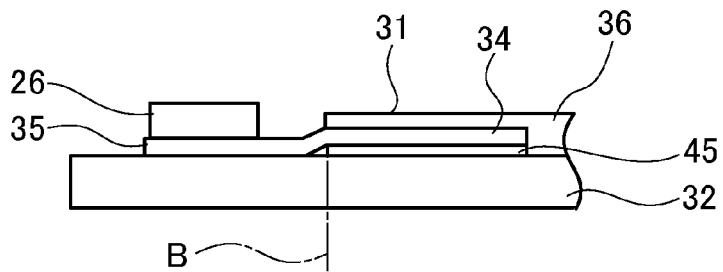
FIG. 10A is a view for describing the method of manufacturing the circuit board 30.
Figure 10B:
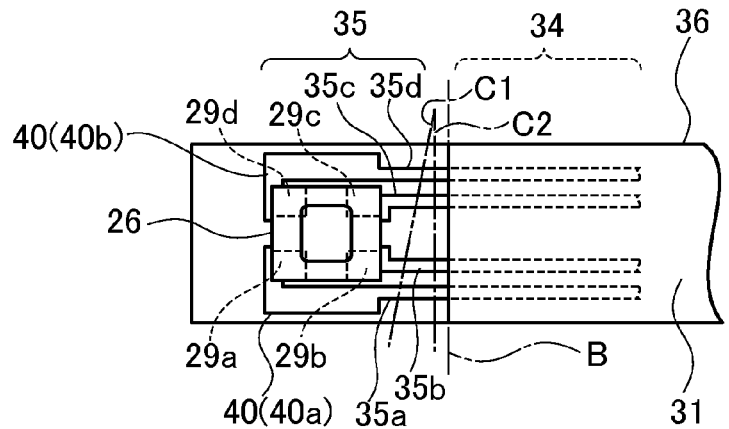
FIG. 10B is a view for describing the method of manufacturing the circuit board 30.

Next, an example of a method of manufacturing the circuit board 30 will be described referring to FIG. 4 to FIG. 10B.
(Step 1)
First, as illustrated in FIG. 4, the adhesive 45 is applied onto the upper surface of the substrate 32. In this case, the adhesive 45 is only applied in a region 46 in which the first circuit pattern portion 34 is to be formed of the upper surface of the substrate 32, and is not applied in a region 47 in which the second circuit pattern portion 35 is to be formed.
(Step 2)
As illustrated in FIG. 5, a copper plate 48 is attached to the upper surface of the substrate 32. The copper plate 48 is formed in a size that can cover the entire surface of the substrate 32. The section of the copper plate 48 located in the region 46 to which the adhesive 45 was applied is adhered to the substrate 32, and it is possible to peel off the section of the copper plate 48 located in the region 47 to which the adhesive 45 was not applied, from the substrate 32.
(Step 3)
As illustrated in FIG. 6, a circuit pattern 49 is printed on the copper plate 48. In this case, the pattern shape of the circuit pattern 49 is the same shape as the first circuit pattern portion 34 and second circuit pattern portion 35.
(Step 4)
As illustrated in FIG. 7, an etching process using acid is performed to form the first circuit pattern portion 34 and the second circuit pattern portion 35 on the copper plate 48.
(Step 5)
As illustrated in FIG. 8, the circuit pattern 49 that was printed on the copper plate 48 is cleaned to thereby remove the circuit pattern 49.
(Step 6)
As illustrated in FIG. 9A, the resist 36 is formed on the upper side of the first circuit pattern portion 34. Accordingly, as illustrated in the plan vies in FIG. 9B, the resist 36 covers only the first circuit pattern portion 34. On the other hand, since the second circuit pattern portion 35 is not covered by the resist 36, the second circuit pattern portion 35 is in an exposed state. The upper surface of the resist 36 functions as the mounting surface 31.
(Step 7)
As illustrated in FIG. 10A, the LED module 26 is connected from the upper side of the second circuit pattern portion 35 that is exposed. In this case, as illustrated in the plan view in FIG. 10B, the first wiring portion 35a is connected to the first electrode portion 29a, the second wiring portion 35b is connected to the second electrode portion 29b, the third wiring portion 35c is connected to the third electrode portion 29c, and the fourth wiring portion 35d is connected to the fourth electrode portion 29d.

(Step 8)

As illustrated in FIG. 3A to FIG. 3C that are described above, the second circuit pattern portion 35 is separated from the substrate 32 and bent 90 degrees with respect to the mounting surface 31. In this case, the pattern face 38 of the second circuit pattern portion 35 is bent so as to be orthogonal to the main-scan direction. As described above, since the second circuit pattern portion 35 is not adhered to the substrate 32, the second circuit pattern portion 35 can be peeled off the substrate 32.

A driving circuit of the light source 25 and the image sensor 43 are then mounted on the mounting surface 31 of the circuit board 30, and thus the circuit board 30 is manufactured.

The circuit board 30 can be assembled into the frame 12 by fixing the circuit board 30 manufactured as described above in the substrate housing portion 15 formed on the lower surface of the frame 12, and also adhering the positioning portion 40 of the bent second circuit pattern portion 35 to the wall surface 17 or wall surface 18 of the frame 12.

According to the present embodiment, the circuit board 30 has the first circuit pattern portion 34 and the second circuit pattern portion 35 that are formed in a continuous manner, with the second circuit pattern portion 35 being formed to be capable of bending so as to separate from the substrate 32, and the light source 25 is connected thereto. Therefore, since it is not necessary to separately provide a flexible substrate or the like to connect the light source 25 and the circuit board 30, the cost of the illumination apparatus or the image sensor unit 10 can be reduced.

Further, since the surface-mount LED module 26 in which the LED chips 28 are mounted on the front surface and the electrodes 29 that are connected to the second circuit pattern portion 35 are formed on the rear surface can be applied as the light source 25, the cost of the illumination apparatus or the image sensor unit 10 can be further reduced.

Further, the positioning portion 40 that is positioned with respect to the frame 12 is integrally formed on the second circuit pattern portion 35. The light source 25 connected to the second circuit pattern portion 35 can be positioned with respect to the frame 12 by the positioning portion 40. Therefore, since positioning between the light guide 20 that is supported by the frame 12 and the light source 25 can be performed, the light source 25 can be arranged at a position facing the incident surface 21 of the light guide 20. Since it is not necessary to provide a member for positioning because the positioning portion 40 is formed integrally with the second circuit pattern portion 35 in this manner, the cost of the illumination apparatus or the image sensor unit 10 can be further reduced.

(Second Embodiment)

Figure 22A:
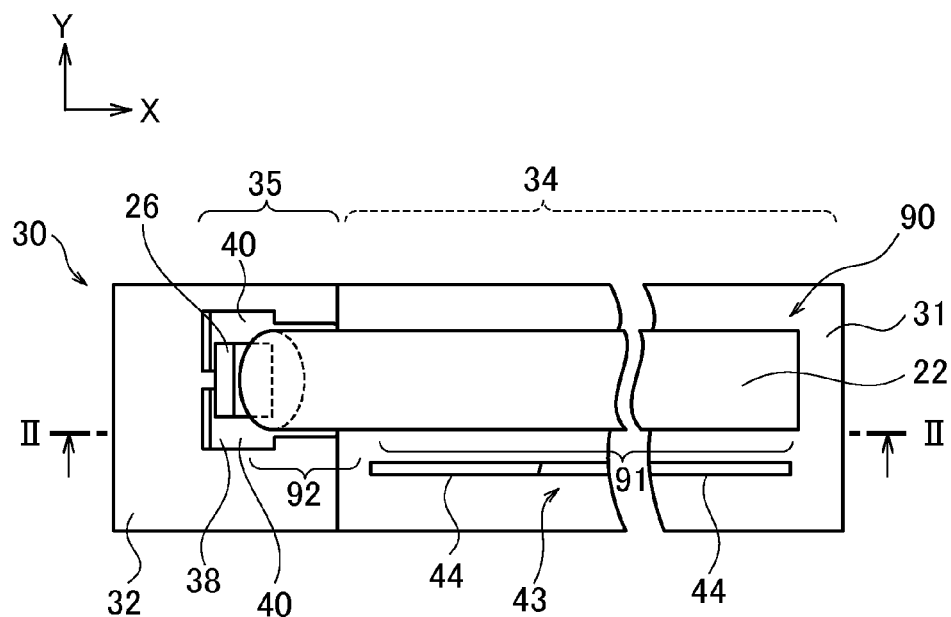
FIG. 22A is a plan view illustrating a configuration of the circuit board 30 when using a light guide 90 having a curved portion 92 according to a second embodiment.
Figure 22B:
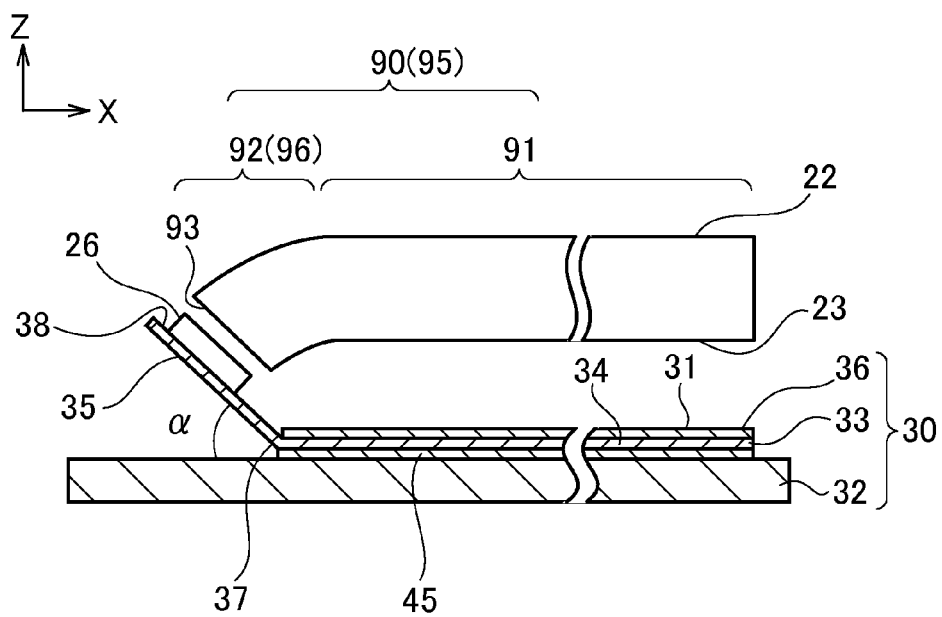
FIG. 22B is a sectional view obtained by cutting the circuit board 30 illustrated in FIG. 22A along a line II-II.

Next, a case of using a light guide 90 having a curved portion 92 according to a second embodiment will be described referring to FIG. 22A and FIG. 22B. FIG. 22A is a plan view illustrating a configuration of the circuit board 30 when using the light guide 90 having the curved portion 92. FIG. 22B is a sectional view obtained by cutting the circuit board 30 illustrated in FIG. 22A along a line II-II. The same components as in the first embodiment are designated with the same reference numerals, and the description will not be repeated.

As illustrated in FIG. 22A and FIG. 22B, the light guide 90 of the present embodiment has a light emitting portion 91 and the curved portion 92. Similarly to the light guide 20 of the first embodiment, the emission surface 22 and the diffusing surface 23 are formed on the light emitting portion 91. The curved portion 92 is connected in a continuous manner from an end of the light emitting portion 91, and is curved towards the circuit board 30. An incident surface 93 from which the light from the LED module 26 enters is formed at one end face of the curved portion 92. The incident surface 93 is inclined with respect to the mounting surface 31.

The second circuit pattern portion 35 of the circuit pattern 33 is bent at the curved portion 37, and is inclined with respect to the mounting surface 31. Specifically, the second circuit pattern portion 35 is bent with a bending angle (angle α shown in FIG. 22B) that is less than 90 degrees so that the pattern face 38 of the second circuit pattern portion 35 is parallel to the incident surface 93 of the light guide 90. Therefore, the LED chips 28 of the LED module 26 are arranged facing the incident surface 93 of the light guide 20. When the LED chips 28 are turned on, light which enters from the incident surface 93 is guided to the light emitting portion 91 while being reflected inside the curved portion 92, and is emitted to the original P from the emission surface 22 of the light emitting portion 91.

According to the present embodiment, the LED chips 28 of the LED module 26 and the incident surface 93 of the curved portion 92 of the light guide 90 are caused to face each other by bending the second circuit pattern portion 35 at an angle of less than 90 degrees with respect to the mounting surface 31. Accordingly, the dimensions in the vertical direction of the image sensor unit can be reduced in comparison to the case of bending the second circuit pattern portion 35 at an angle of 90 degrees with respect to the mounting surface 31.

Figure 23:
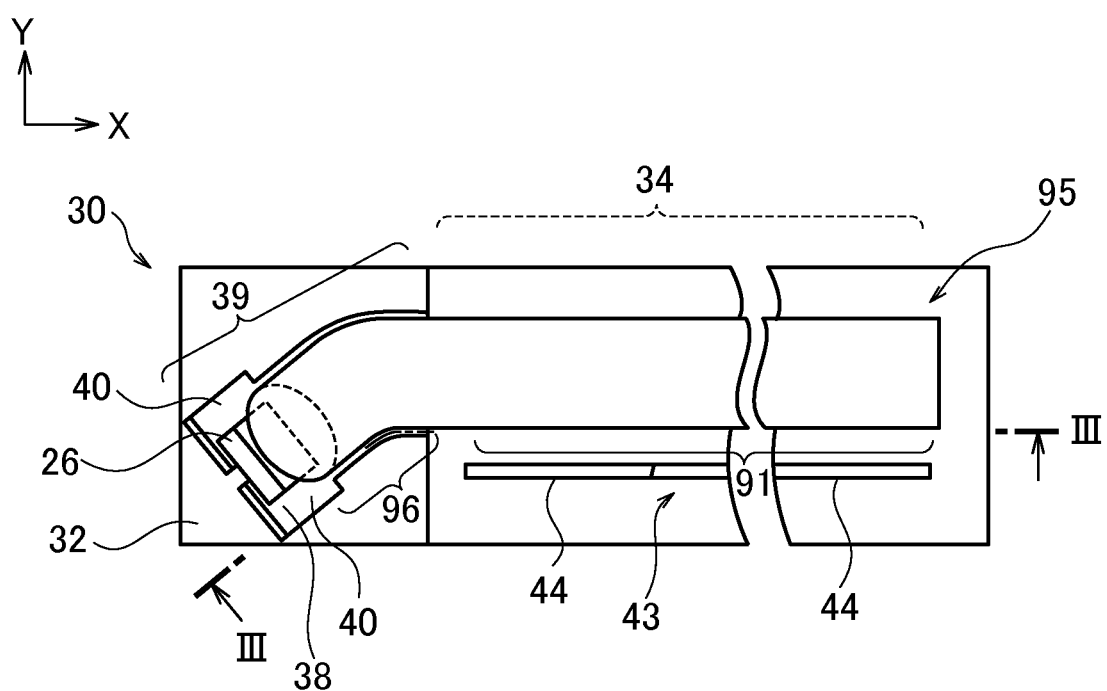
FIG. 23 is a plan view illustrating a configuration of the circuit board 30 when using a light guide 95 having a curved portion 96 according to the second embodiment.

The curved portion of the light guide is not limited to only a case where the curved portion is curved towards the circuit board 30, and may also be curved in the sub-scan direction. FIG. 23 is a plan view illustrating a configuration of the circuit board 30 when using a light guide 95 having a curved portion 96 that is curved in the sub-scan direction. The curved portion 96 of the light guide 95 curves towards the image sensor IC 44 side in the sub-scan direction. Further, as illustrated in FIG. 23, a second circuit pattern portion 39 inclines towards the image sensor IC side. Here, a sectional view obtained by cutting the circuit board 30 illustrated in FIG. 23 along a line III-III is similar to the sectional view in FIG. 22B, with the LED chips 28 of the LSD module 26 and the incident surface 93 of the curved portion 96 of the light guide 95 facing each other.

By using the light guide 95 having the curved portion 96 that curves towards the image sensor IC 44 side in this manner, the LED chips 28 and the incident surface 93 of the curved portion 96 of the light guide 95 can be caused to face each other at a n extended position in the longitudinal direction of the image sensor IC 44. Therefore, the space inside the frame 12 can be effectively used, and the dimensions of the image sensor unit can be reduced.

The above described curved portions 92 and 96 of the light guides 90 and 95 are not limited to a curved shape, and may be a bent shape as long as the shape guides light which has entered from the incident surface 93 to the light emitting portion 91.

(Third Embodiment)

Figure 11A:
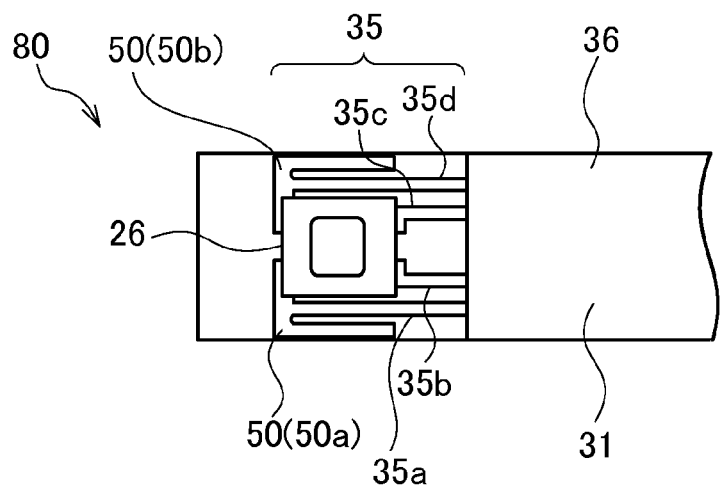
FIG. 11A is a view illustrating a configuration of a circuit board 80 according to a third embodiment.
Figure 11B:
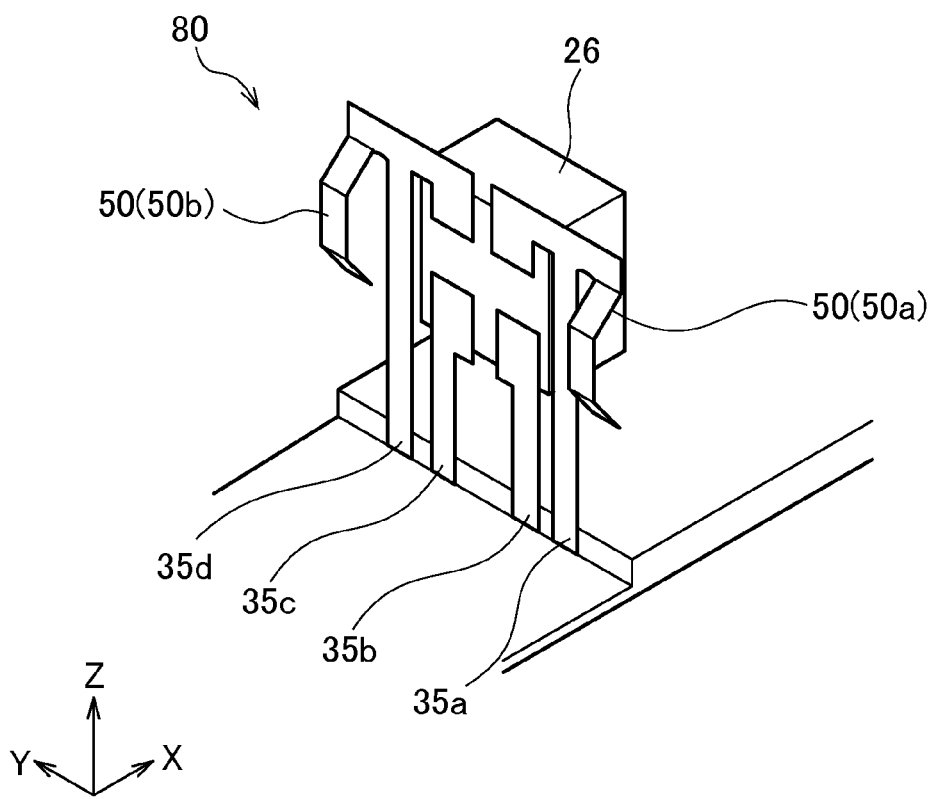
FIG. 11B is a perspective view illustrating a second circuit pattern portion 35 shown in FIG. 11A in a bent state.

Next, the shape of a positioning portion 50 according to a third embodiment will be described referring to FIG. 11A and FIG. 11B. FIG. 11A is a plan view illustrating a state in which the LED module 26 is connected to the second circuit pattern portion 35. FIG. 11B is a perspective view showing the second circuit pattern portion 35 in a bent state. The same components as in the first embodiment are designated with the same reference numerals, and the description will not be repeated.

As illustrated in FIG. 11A, the positioning portion 50 of the present embodiment has a first urging portion 50a that is formed integrally with the first wiring portion 35a, and a second urging portion 50b that is formed integrally with the fourth wiring portion 35d. The first urging portion 50a branches from the first wiring portion 35a in the sub-scan direction away from the LED module 26, and is formed in the same direction as the wiring direction of the first wiring portion 35a. The second urging portion 50b branches from the fourth wiring portion 35d in the sub-scan direction away from the LED module 26, and is formed in the same direction as the wiring direction of the fourth wiring portion 35d.

Further, as illustrated in FIG. 11B, the first urging portion 50a and the second urging portion 50b are bent in a convex shape in the main-scan direction in a state in which the second circuit pattern portion 35 is bent. A circuit board 80 configured in this manner can be incorporated into the frame 12 by pressing the first urging portion 50a and the second urging portion 50b into the space between the wail surface 17 and wall surface 18 of the frame 12 from the lower direction. The second circuit pattern portion 35 is positioned with respect to the frame 12 by the first urging portion 50a and the second urging portion 50b urging the wall surface 17 in the main-scan direction. The light source 25 connected to the second circuit pattern portion 35 can be positioned with respect to the frame 12 by the first urging portion 50a and the second urging portion 50b.

(Fourth Embodiment)

Figure 12:
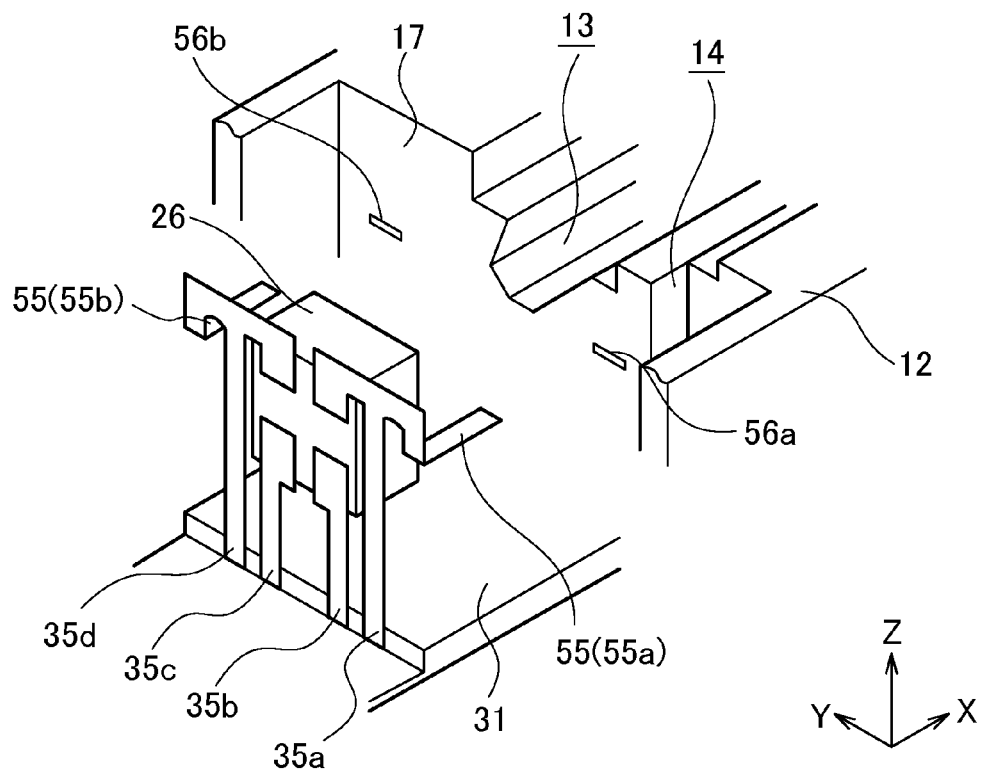
FIG. 12 is a perspective view illustrating a positioning portion 55 according to a fourth embodiment.

Next, the shape of a positioning portion 55 according to a fourth embodiment will be described referring to FIG. 12. FIG. 12 is a perspective view showing the second circuit pattern portion 35 in a bent state. The same components as in the first embodiment are designated with the same reference numerals, and the description will not be repeated.

As illustrated in FIG. 12, the positioning portion 55 of the present embodiment has a first positioning portion 55a that is formed integrally with the first wiring portion 35a, and a second positioning portion 55b that is formed integrally with the fourth wiring portion 35d. The first positioning portion 55a and the second positioning portion 55b are bent so as to protrude toward the wall surface 17 side of the frame 12, and are formed parallel to the mounting surface 31.

Figure 13:
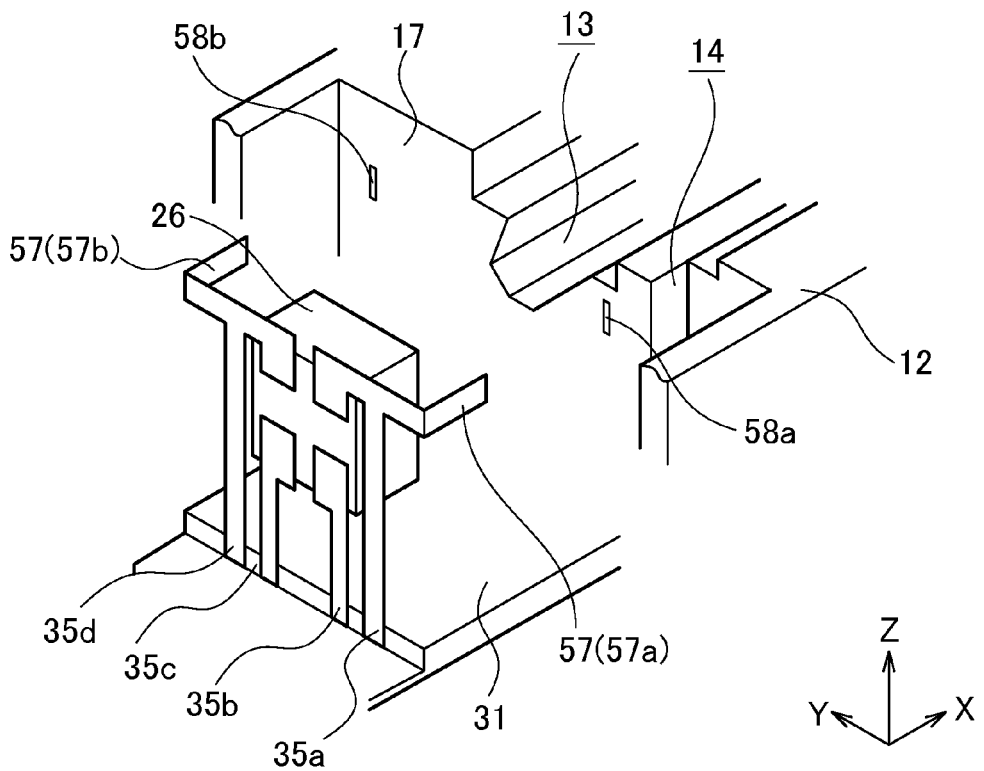
FIG. 13 is a perspective view illustrating a positioning portion 57 according to the fourth embodiment.

An insertion hole 56a and an insertion hole 56b, to which the first positioning portion 55a and the second positioning portion 55b are inserted, are formed in the wail surface 17 of the frame 12. Accordingly, the second circuit pattern portion 35 can be positioned with respect to the frame 12 by inserting the first positioning portion 55a and the second positioning portion 55b into the insertion hole 56a and the insertion hole 56b in the wall surface 17. The first positioning portion 55a and the second positioning portion 55b are not limited to a case in which the first positioning portion 55a and the second positioning portion 55b are formed parallel to the mounting surface 31. For example, as illustrated in FIG. 13, a configuration may be adopted in which positioning portions 57 (a first positioning portion 57a and a second positioning portion 57b) are formed perpendicular to the mounting surface 31. In this case, an insertion hole 58a and an insertion hole 58b, to which the first positioning portion 57a and the second positioning portion 57b are inserted, are formed in the wail surface 17 of the frame 12.

(Fifth Embodiment)

Figure 14:
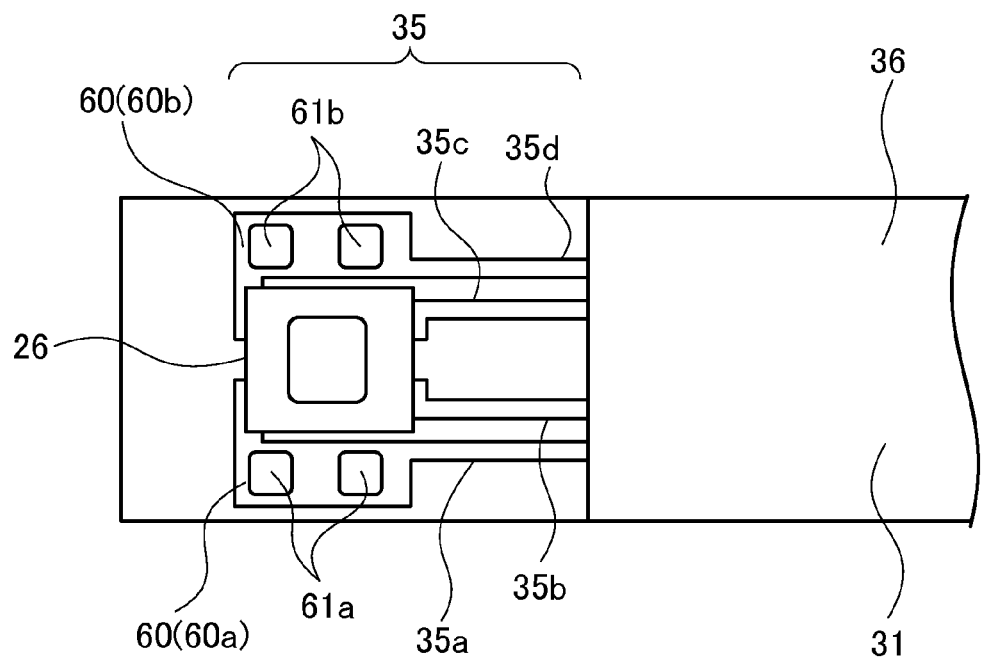
FIG. 14 is a view illustrating a positioning portion 60 according to a fifth embodiment.

Next, the shape of a positioning portion 60 according to a fifth embodiment will be described referring to FIG. 14. FIG. 14 is a plan view showing the second circuit pattern portion 35 in a state before the second circuit pattern portion 35 is bent. The same components as in the first embodiment are designated with the same reference numerals, and the description will not be repeated.

Figure 15:
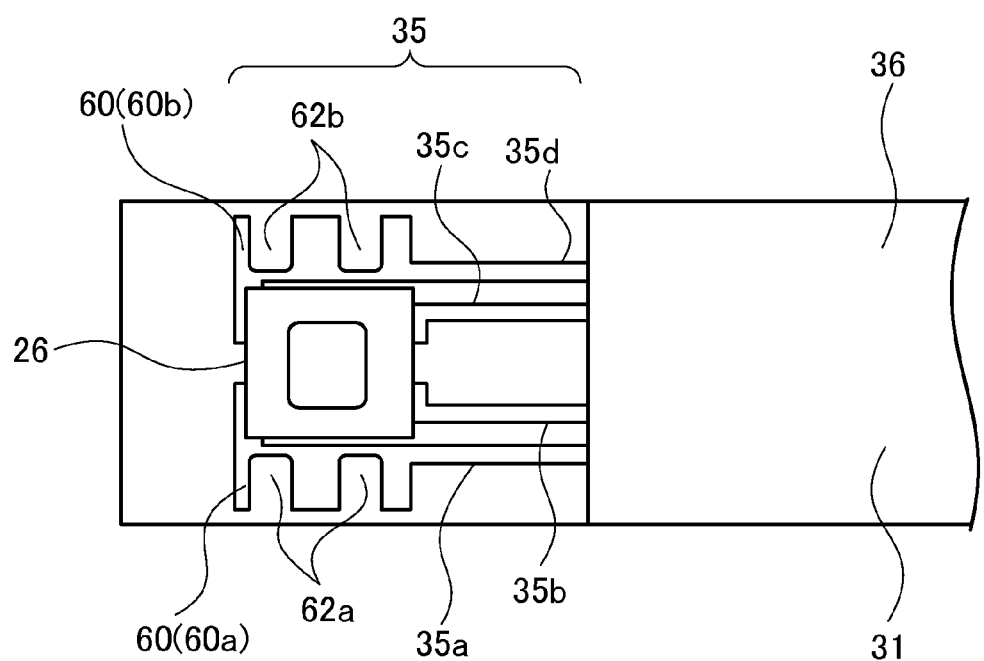
FIG. 15 is a view illustrating the positioning portion 60 according to the fifth embodiment.

As illustrated in FIG. 14, the positioning portion 60 of the present embodiment has a first positioning portion 60a that is formed integrally with the first wiring portion 35a, and a second positioning portion 60b that is formed integrally with the fourth wiring portion 35d. Insertion holes 61a and 61b for inserting screws through are formed in the first positioning portion 60 and the second positioning portion 60b. Therefore, the second circuit pattern portion 35 can be positioned with respect to the frame 12 by inserting respective screws through the insertion hole 61a and the insertion hole 61b and thereafter threading the screws into screw holes formed in the wail surface 17 or wall surface 18 of the frame 12. The insertion holes according to the present embodiment are not limited to the insertion holes 61a and 61b through which screws are inserted, and for example may be insertion holes 62a and 62b formed in a notch shape as illustrated in FIG. 15. Further, the present embodiment is not limited to a case where screws are inserted through the insertion holes 61a, 61b, 62a and 62b, and the second circuit pattern portion 35 may be positioned with respect to the frame 12 by being fitted to a projection formed on the wall surface 17 or the like of the frame 12.

Although the present invention has been described along with various embodiments, the present invention is not limited to the embodiments, and changes and the like can be made within the scope of the present invention, and the above described embodiments may also be appropriately combined.

For example, the present invention is not limited to the above described manufacturing method, and it is only necessary that the second circuit pattern portion 35 can be formed to be capable of bending away from the substrate 32. Other manufacturing methods will be described hereunder referring to FIG. 16 and FIG. 17.

Figure 16:
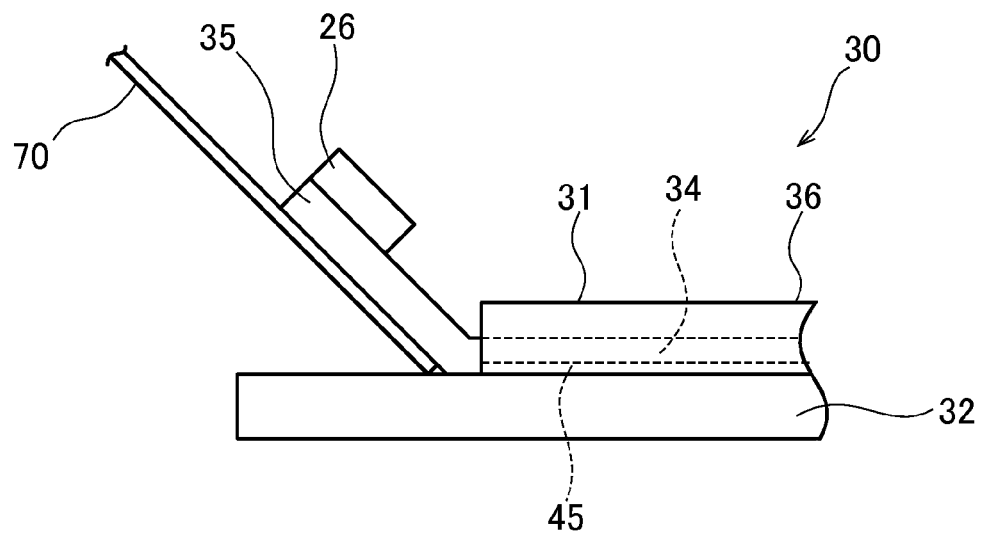
FIG. 16 is a view for describing another method of manufacturing the circuit board 30.

FIG. 16 is a view for describing a first other method of manufacturing the circuit board 30. In this case, in step 1, the adhesive 45 is applied over the entire upper surface of the substrate 32. Thereafter, in the circuit board 30 manufactured by the above described step 2 to step 7, the second circuit pattern portion 35 remains bonded to the substrate 32 by the adhesive 45. Therefore, as illustrated in FIG. 16, the second circuit pattern portion 35 can be arranged separately from the substrate 32 by inserting a plate-like tool 70 between the second circuit pattern portion 35 and the substrate 32 to cause the second circuit pattern portion 35 to peel off from the substrate 32.

Figure 17:
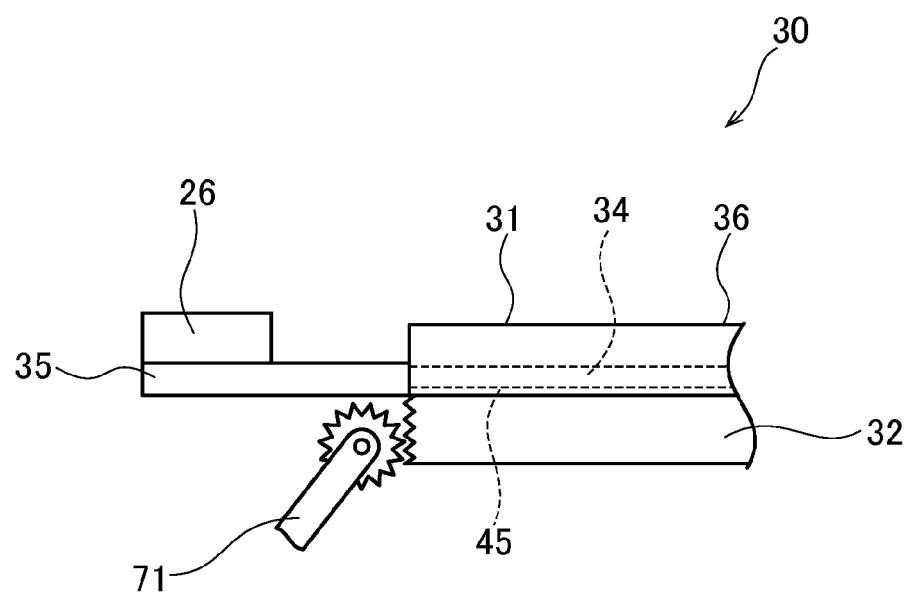
FIG. 17 is a view for describing another method of manufacturing the circuit board 30.

FIG. 17 is a view for describing a second other method of manufacturing the circuit board 30. In this case, in step 1, the adhesive 45 is applied over the entire upper surface of the substrate 32. Thereafter, in the circuit board 30 manufactured by the above described step 2 to step 7, the second circuit pattern portion 35 remains bonded to the substrate 32 by the adhesive 45. Therefore, as illustrated in FIG. 17, the second circuit pattern portion 35 can be arranged separately from the substrate 32 by cutting only the substrate 32 using a cutting tool 71 (for example, a grinder).

Figure 18:
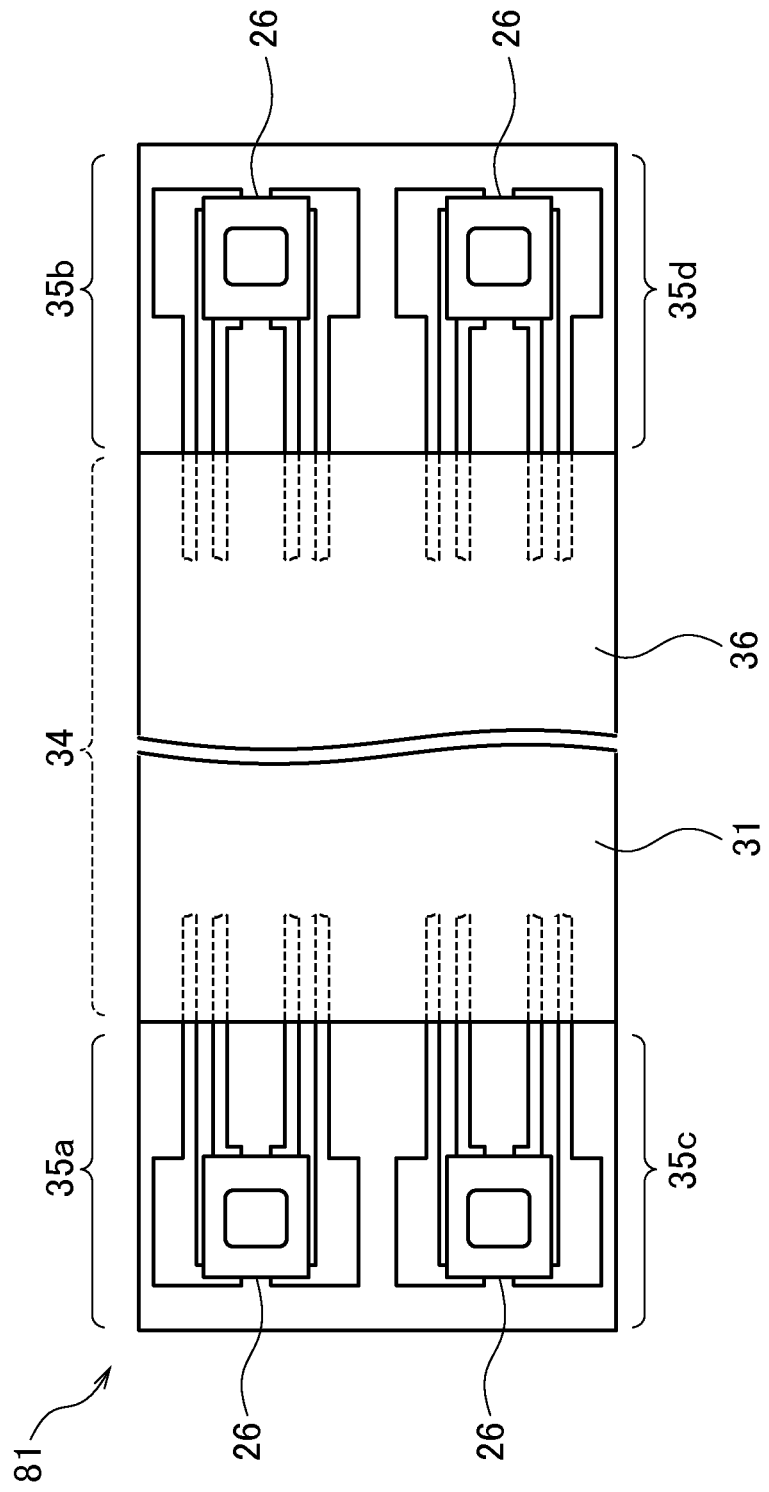
FIG. 18 is a view illustrating a configuration of another circuit board 81.

Although the embodiments describe cases of forming the incident surface 21 at only one of both end faces in the main-scan direction of the light guide 20, the present invention is not limited to such cases, and the incident surface 21 may be formed at the other end face also. In such cases, a configuration can be applied in which, as illustrated in FIG. 18, second circuit pattern portions 35a and 35b are formed on both sides in the main-scan direction of a circuit board 81.

In addition, the present invention is not limited to a case of applying a single light guide 20, and a plurality of the light guides 20 may be arranged parallel to the frame 12. In this case, as illustrated in FIG. 18, a configuration that corresponds to the plurality of light guides 20 can be adopted by modifying the circuit pattern 33 and without providing an additional member by arranging second circuit pattern portions 35c and 35d in parallel in the sub-scan direction of the second circuit pattern portions 35a and 35b.

Although the embodiments describe cases of bending the second circuit pattern portion 35, the present invention is not limited to such cases, and the second circuit pattern portion 35 may be curved by means of a curved portion. That is, a form of turning the second circuit pattern portion 35 is not limited to only bending as long as the LED module 26 can be caused to face the incident surface 21 of the light guide 20.

In the embodiments other than the second embodiment described above, cases were described in which the second circuit pattern portion 35 is bent 90 degrees to be arranged in an upright position. However, the present invention is not limited to such cases. That is, as in the second embodiment, the second circuit pattern portions 35 and 39 may be bent at an angle that is less than an angle perpendicular to the mounting surface 31 in conformity with the angle of the incident surface 93 of the light guides 90 and 95.

Further, the position of the curved portion 37 of the second circuit pattern portion 35 can be changed in accordance with the position of the incident surface 21 of the light guide 20. For example, the second circuit pattern portion 35 may be bent at a position that is separated from the first circuit pattern portion 34 as illustrated by an alternate long and two short dashes line C1 in FIG. 10B, or may be bent along an angle inclined with respect to the sub-scan direction as illustrated by an alternate long and two short dashes line C2 in FIG. 10B. By changing the bending position in this manner, the height or orientation of the LED module 26 can be easily changed.

In the above described step 7, fine adjustment of the position at which the LED module 26 faces the incident surface 21 can be performed by slightly shifting the position at which the LED module 26 is connected on the second circuit pattern portion 35 in the main-scan direction or the sub-scan direction. In addition, the position of the LED module 26 can be freely changed by shifting the position at which the second circuit pattern portion 35 is formed on the substrate 32 in the sub-scan direction. Further, for example, in the case illustrated in FIG. 17, the second circuit pattern portion 35 can also be bent to the lower side.

Thus, even if the shape of the light guide 20 is modified according to the usage situation, by changing the circuit pattern 33 it becomes possible to exchange only the light guide 20 for the usage without changing the circuit board 30.

Although the embodiments describe cases of positioning t he positioning portions 40, 50, 55, 57, and 60 with respect to the frame 12, the present invention is not limited to such cases. For example, the positioning portions 40, 50, 55, 57, and 60 may be positioned by being adhered or coupled to the cover glass 11 or the light guide 20.

Further, other than a glass epoxy substrate, a flexible circuit board or the like can be used as the circuit boards 30, 80, and 81 of the embodiments.

According to the present invention, the cost of an image sensor unit can be reduced since it is not necessary to add a member that connects a light source and a circuit board.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An image sensor unit that reads light emitted to an object of illumination, comprising:
   a light source;
   a light guide that guides light from the light source to the object of illumination;
   a light condenser that focuses light from the object of illumination;
   an image sensor that receives light that is focused by the light condenser, and converts the light to an electric signal; and
   a circuit board on which the light source and the image sensor are mounted;
   wherein:
   the light guide includes:
   an incident surface from which the light from the light source enters, and
   an emission surface that emits the light which enters from the incident surface to the object of illumination;
   the circuit board includes:
   a substrate,
   a circuit pattern portion formed on the substrate;
   wherein:
   the circuit pattern portion includes:
   a part on the substrate, and
   a part away from the substrate, and
   the light source is connected to the part away from the substrate, and
   the light source is arranged facing the incident surface by bending the circuit pattern portion between a part connecting with the light source and the part on the substrate.

2. The image sensor unit according to claim 1, wherein the light source is a surface-mount LED module in which an LED chip is mounted on a front surface and an electrode that is connected to the part away from the substrate is formed on a rear surface.

3. The image sensor unit according to claim 1, wherein:
   the incident surface of the light guide is arranged orthogonal to a mounting surface of the circuit board, and
   the light source is arranged facing the incident surface by bending the part away from the substrate 90 degrees with respect to the mounting surface of the circuit board.

4. The image sensor unit according to claim 1, wherein:
   the incident surface of the light guide is arranged in an inclined manner with respect to a mounting surface of the circuit board; and
   the light source is arranged facing the incident surface by bending the part away from the substrate at an angle that is less than 90 degrees with respect to the mounting surface of the circuit board.

5. The image sensor unit according to claim 1, further comprising a supporting body that supports the circuit board and the light guide,
   wherein the part away from the substrate has a positioning portion that positions the part away from the substrate with respect to the supporting body.

6. The image sensor unit according to claim 5, wherein the positioning portion is an urging portion that urges against the supporting body.

7. An image reading apparatus, comprising:
an image sensor unit that reads light emitted to an object of illumination, that comprises:
a light source,
a light guide that guides light from the light source to the object of illumination,
a light condenser that focuses light from the object of illumination,
an image sensor that receives light that is focused by the light condenser, and converts the light to an electric signal, and
a circuit board on which the light source and the image sensor are mounted,
wherein:
the light guide includes:
an incident surface from which the light from the light source enters, and
an emission surface that emits the light which enters from the incident surface to the object of illumination,
the circuit board includes:
a substrate,
a circuit pattern portion formed on the substrate;
wherein:
the circuit pattern portion includes:
a part on the substrate, and
a part away from the substrate, and
the light source is connected to the part away from the substrate, and
the light source is arranged facing the incident surface by bending the circuit pattern portion between a part connecting with the light source and the part on the substrate;
and a moving portion that relatively moves the image sensor unit and the object of illumination.

8. An image forming apparatus, comprising:
an image sensor unit that reads light emitted to an object of illumination, that comprises:
a light source,
a light guide that guides light from the light source to the object of illumination,
a light condenser that focuses light from the object of illumination,
an image sensor that receives light that is focused by the light condenser, and converts the light to an electric signal, and
a circuit board on which the light source and the image sensor are mounted,
wherein:
the light guide includes:
an incident surface from which the light from the light source enters, and
an emission surface that emits the light which enters from the incident surface to the object of illumination,
the circuit board includes:
a substrate,
a circuit pattern portion formed on the substrate;
wherein:
the circuit pattern portion includes:
a part on the substrate, and
a part away from the substrate, and
the light source is connected to the part away from the substrate, and
the light source is arranged facing the incident surface by bending the circuit pattern portion between a part connecting with the light source and the part on the substrate;
a moving portion that relatively moves the image sensor unit and the object of illumination;
and an image forming portion that forms an image that is read by the image sensor unit on a recording medium.

* * * * *